May 31, 1955

W. A. WILLIAMS 2,709,374

ADJUSTABLE DIAMETER SHEAVES

Filed Sept. 10, 1952

INVENTOR:
William A. Williams;
BY Paul & Paul
ATTORNEYS.

May 31, 1955

W. A. WILLIAMS

2,709,374

ADJUSTABLE DIAMETER SHEAVES

Filed Sept. 10, 1952

INVENTOR:
William A. Williams,
BY Paul & Paul
ATTORNEYS.

May 31, 1955  W. A. WILLIAMS  2,709,374
ADJUSTABLE DIAMETER SHEAVES
Filed Sept. 10, 1952  9 Sheets-Sheet 3

FIG_2_

FIG_3_

INVENTOR:
William A. Williams,
BY Paul & Paul
ATTORNEYS.

May 31, 1955 W. A. WILLIAMS 2,709,374
ADJUSTABLE DIAMETER SHEAVES
Filed Sept. 10, 1952 9 Sheets-Sheet 5

FIG_6_

FIG_7_

INVENTOR:
William A. Williams,
BY Paul & Paul
ATTORNEYS.

May 31, 1955 — W. A. WILLIAMS — 2,709,374
ADJUSTABLE DIAMETER SHEAVES
Filed Sept. 10, 1952 — 9 Sheets-Sheet 7

FIG_9_

INVENTOR:
William A. Williams,
BY Paul & Paul
ATTORNEYS.

May 31, 1955

W. A. WILLIAMS

2,709,374

ADJUSTABLE DIAMETER SHEAVES

Filed Sept. 10, 1952

2,709,374
ADJUSTABLE DIAMETER SHEAVES

William A. Williams, Philadelphia, Pa., assignor to The American Pulley Company, Philadelphia, Pa., a corporation of Pennsylvania Application September 10, 1952, Serial No. 308,777

20 Claims. (Cl. 74—230.17)

This invention relates to adjustable diameter sheaves, that is to say, to sheaves of a type designed for use with V belts wherein opposingly-beveled flanges are laterally shiftable relatively to vary the effective diameter of the sheaves for speed ratio changes in transmissions in which the sheaves are employed.

The chief aim of my invention is to enable such speed ratio changes to be made during rotation of the sheaves. This objective is realized in practice as hereinafter more fully diclosed, through provision of a split hub sleeve upon which the opposing sheave flanges are mounted; yielding means tending to shift said flanges laterally relative to each other along the sleeve; spring urged wedge means by which the sleeve is normally expanded to hold the flanges against shifting; and control means restrained against rotation for breaking the lock between the wedge means and the sleeve so as to permit the latter to contract and thereby allow adjustment of the flanges to take place automatically under the influence of the yielding means aforesaid.

Other objects and attendant advantages will appear from the following detailed description of the attached drawings wherein.

Figure 1:
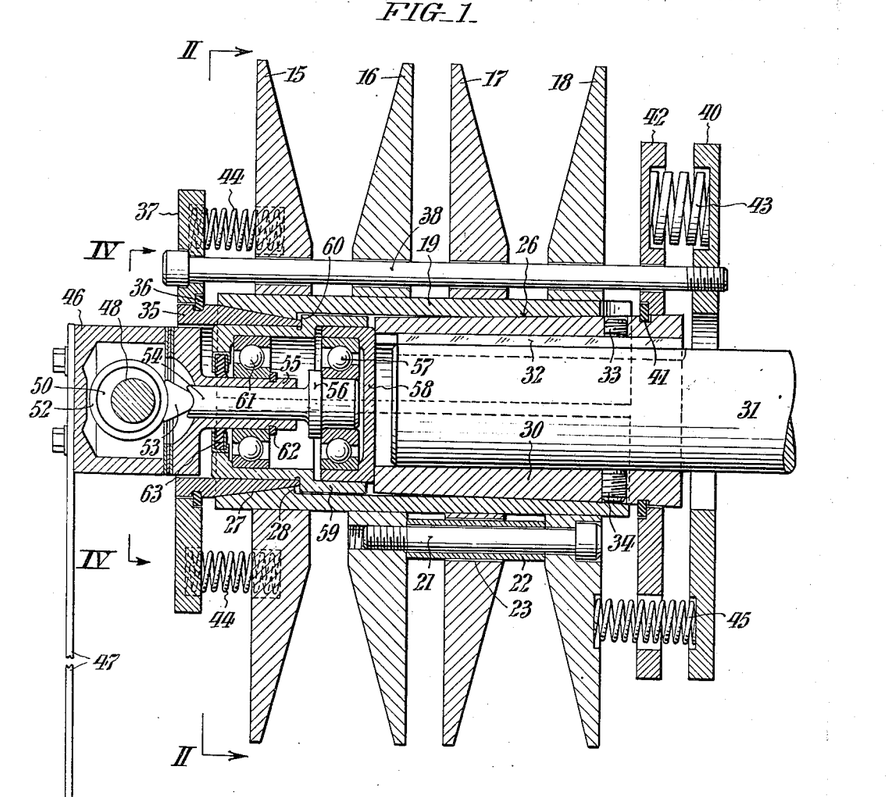
Fig. 1 is a view in axial section of a multi-groove adjustable sheave conveniently embodying my invention in one form, the section being taken as indicated by the angled arrows I—I in Fig. 2.
Figure 2:
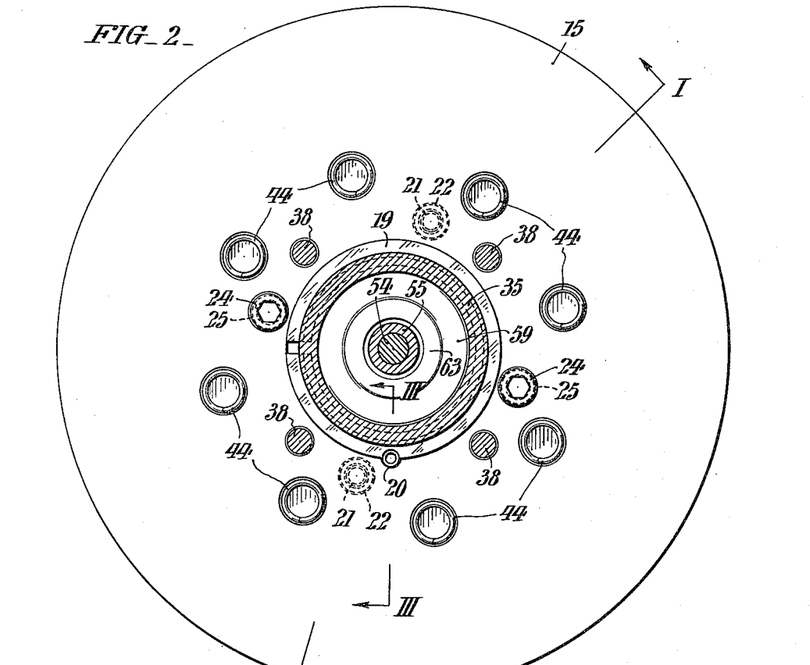
Fig. 2 is a transverse sectional view taken as indicated by the angled arrows II—II in Fig. 1.
Figure 3:
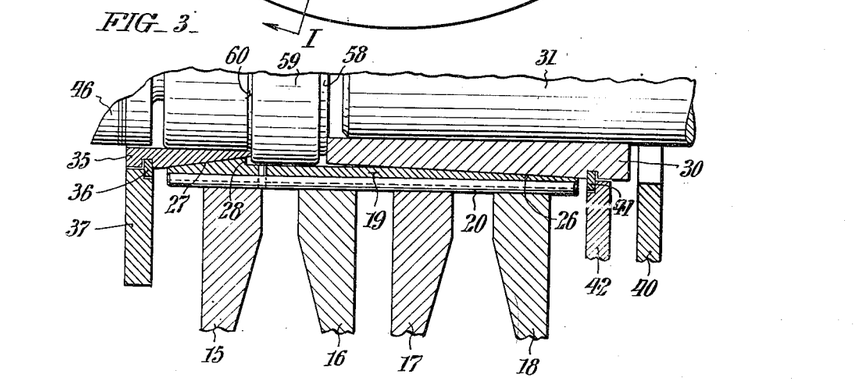
Fig. 3 is a fragmentary view in longitudinal section taken as indicated by the angled arrows III—III in Fig. 2.
Figure 4:
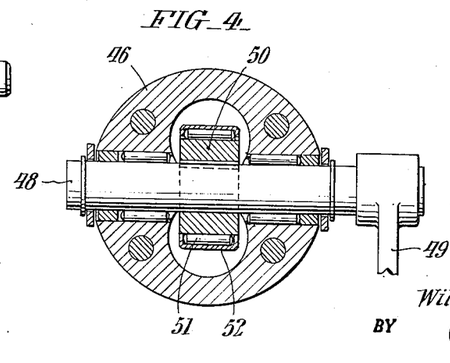
Fig. 4 is a detail view in cross section taken as indicated by the angled arrows IV—IV in Fig. 1 and drawn to a larger scale.

In Figs. 1-4 of these illustrations, my invention is shown as embodied in a double groove wedge belt sheave comprising two pairs of opposingly-beveled annular sheave flanges 15, 16 and 17, 18 which are mounted upon a longitudinally split sleeve 19 with capacity for being axially shifted, as later on explained, while constrained against relative rotation by a round section key indicated at 20 in Figs. 2 and 3. The flanges 16 and 18 are connected together by a pair of diametrically-arranged screws 21 and are maintained in definitely spaced relation by tubular spacers 22 surrounding the screw shanks which pass through clearance apertures 23 in flanges 17 as shown in Fig. 1. The flanges 15 and 17 are connected together in a like manner by another pair of diametrically arranged screws 24 which are shown only in Fig. 2 and which are disposed in quadrant relation to the screws 21, and said flanges are similarly maintained in a definitely spaced relation by tubular spacers 25. Hub sleeve 19 has a cylindric outer surface, but its bore is inwardly tapered from opposite ends as at 26 and 27 in Figs. 1 and 3. It will be noted that the taper 26 is comparatively long and gentle; while the taper 27 is shorter and more abrupt and terminates in an internal annular shoulder 28 within hub sleeve 19.

Engaging into the long taper 26 of hub sleeve 19 and extending partway into the latter, is a bushing 30 whereof the external surface is correspondingly tapered, said bushing being mounted on the end of a shaft 31, for example of a driving motor, and being fixedly connected to said shaft by a key 32 and set screws 33, 34.

Engaging into the opposite end of hub sleeve 19 is a short tubular wedge element 35 with an external taper corresponding to the taper 27. From Fig. 1 it will be seen that wedge element 35 normally extends inwardly slightly beyond annular shoulder 28 within hub sleeve 19. Sprung into a circumferential groove in the protruding end of wedge element 35 is a stop ring 36 for a flange 37 which, at spaced annular intervals, is provided with holes for passage of the shanks of headed tie bolts 38, said shanks extending through clearance openings in the sheave flanges 15—18, and threadedly engaging into an abutment ring 40 which freely surrounds shaft 31 beyond the protruding end of bushing 30. At its protruding end, the wedge bushing 30 also has a circumferential groove wherein is lodged a stop ring 41 for a flange 42 which, like the sheave flanges 15—18, is provided with clearance holes for passage of the shanks of tie bolts 38.

Interposed between collars 40 and 42 in radial alignment with the respective tie bolts 38 are compression springs 43. By virtue of this arrangement, wedge element 35 and hub sleeve 19 are yieldingly urged toward bushing 30, and said sleeve is thereby normally expanded circumferentially within the axial apertures of the sheave flanges 15—18 to prevent displacement of the latter in adjusted positions. Annularly arranged in alternation with screw bolts 38 and in compression between sheave flange 15 and flange 37, are springs 44; and in compression between sheave flange 18 and abutment ring 40 are similarly-arranged springs 45 which latter extend through clearance openings in flange 42.

For the purpose of releasing the sheave flanges 15—18 to the influence of springs 44 and 45 in this instance when adjustments for speed change are to be made, I have provided the manual control means about to be described. As shown, this control means includes a hollow cylindrical member 46 which extends partway axially into wedge element 35 and which is restrained against rotation by a torque arm 47. Rotatively supported by member 46 is transverse a rock shaft 48 whereto is affixed at one end, an actuating hand lever 49. Secured to shaft 48 within member 46 is an eccentric 50 which is surrounded, with interposition of a pin bearing 51, by a tread ring 52 against the periphery of which rides a follower in the form of a shoe 53. The toe end of shoe 53 engages into the recessed end of a plunger pin 54 which is guided for endwise movement in a boss projection 55 of element 46 in the axis of the sheave. Surrounding the distal end of plunger 53 and abutted by a circumferential enlargement 56 on the latter, is the inner race of an anti-friction thrust bearing 57, the outer race of said bearing being set into the hollow of a cup shaped piston-like element 58, the back of which abuts the inner end of wedge bushing 30 on shaft 31. Cup shaped element 58 is lodged within the recessed end of a hollow-like member 59 a portion of which latter is diametrically reduced to fit into the bore of a wedge element 35, with incidental formation of a shoulder 60 in confronting relation to the inner end of said element and the internal shoulder 28 of sleeve 19. Set into the hollow of part 59 is the outer race of an anti-friction thrust bearing 61 whereof the inner race surrounds the boss 55 of element 46 and abuts a stop ring 62 on said boss. The parts 58 and 59 together form a housing for thrust bearings 57 and 61, said housing being sealed for retainment of lubricant, by a packing ring indicated at 63.

Figure 1A:
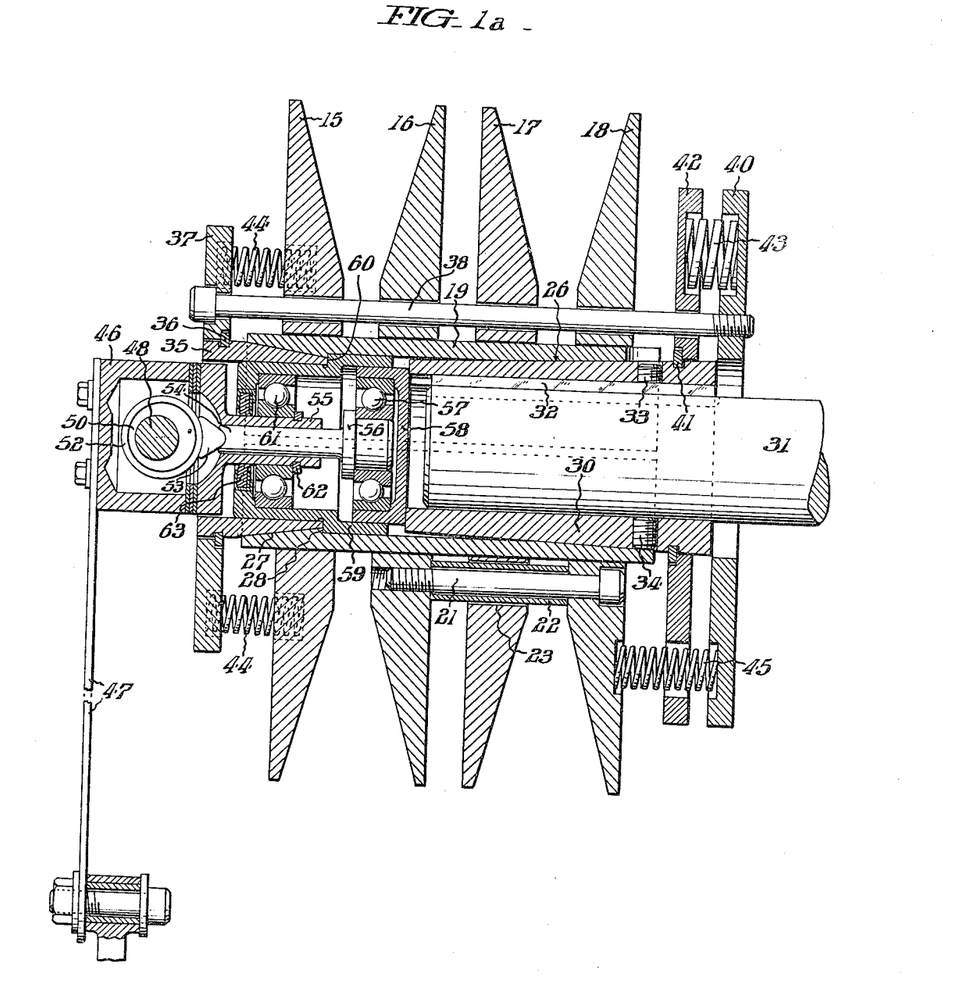
Fig. 1a is a view similar to Fig. 1 showing the sheave flanges released for speed adjustment.

In Fig. 1, hub sleeve 19 and wedge element 35 are shown in their normal positions relative to each other and to wedge bushing 30 with said hub sleeve expanded and holding the sheave flanges 15—18 fixed against displacement. To release the sheave flanges 15—18, shaft 48 is turned clockwise through an angle of 180 degrees from the position in which it is shown in Fig. 1 to the position of Fig. 1a. By attendant reaction of eccentric 50 upon shoe 53, member 46 will be shifted leftward carrying with it part 59 as well as wedge element 35 by reason of the engagement of the inner end of the latter by the annular shoulder 60 on said part 59, torque arm 47 being sufficiently flexible to permit such movement. Eventually shoulder 60 of part 59 will contact internal shoulder 28 of hub sleeve 19. Accordingly upon further leftward movement of part 59, hub sleeve 19 will be carried along with it and be thereby retracted relative to bushing 30 in opposition to the pressure of springs 43. Hub sleeve 19 will thus contract circumferentially to release sheave flanges 15—18, which are then adjusted by controlling the center distance between the sheave and a driven sheave, the sheave flanges 15, 16 and 17, 18 being forced against the belts (not shown) by means of the springs 44 and 45. After the desired speed adjustment is attained, sheave flanges 15—18 are reset against shifting from their new positions by reversing the above described procedure, i. e. by turning hand lever 49 counter clockwise to its original position, when wedge element 35 and hub sleeve 19 will be urged to their normal wedging positions by action of the springs 43 in a manner readily understood from Fig. 1. The adjustment is thus accomplished during rotation of the sheave, while element 46 is restrained against turning by torque arm 47 without attendant wear and fretting corrosion. In this connection, it is to be observed that the inter-engaging wedge parts are so proportioned that only a small amount of relative movement thereof suffices for the release of the sheave flanges or their refixation in newly adjusted positions.

Figure 5:
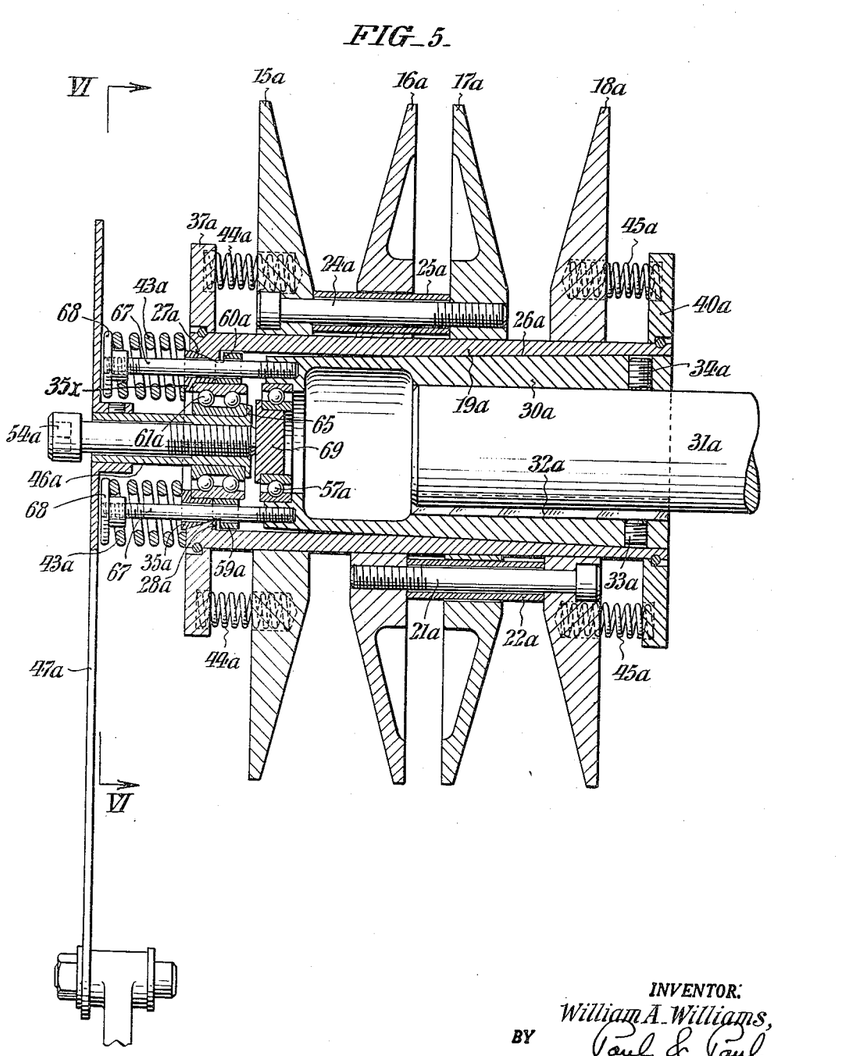
Fig. 5 is a view generally like Fig. 1 showing an alternative embodiment of my invention.
Figure 6:
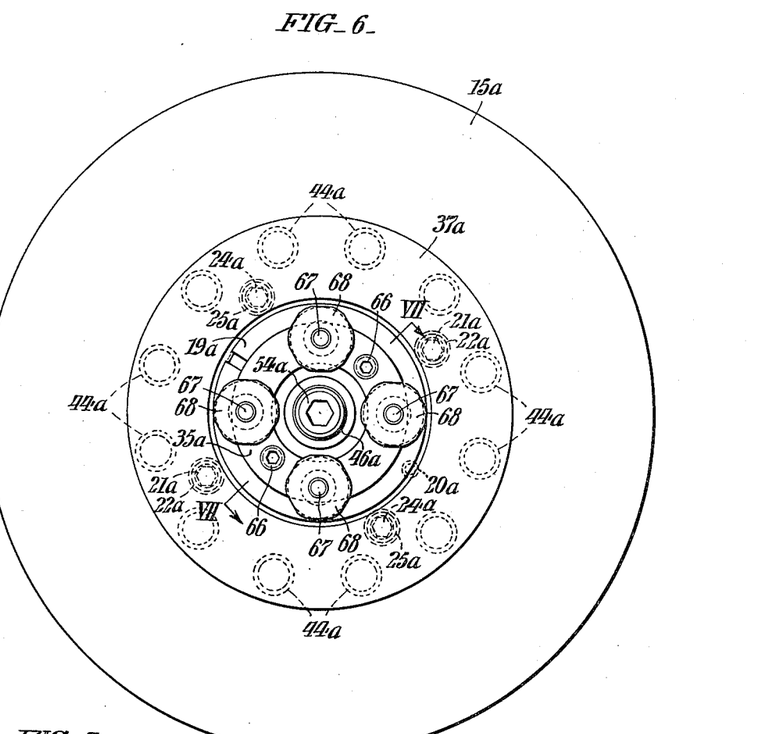
Fig. 6 is a transverse section taken as indicated by the angled arrows VI—VI in Fig. 5.
Figure 7:
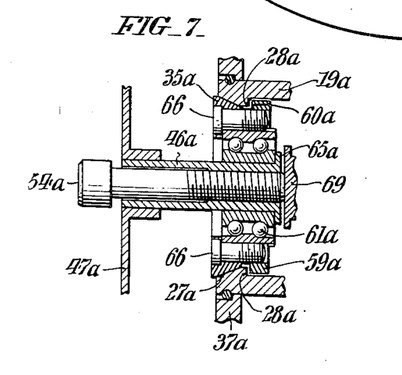
Fig. 7 is a fragmentary detail sectional view taken as indicated by the angled arrows VII—VII in Fig. 6.

In the embodiment of Figs. 5–7, the control means includes a headed screw 54a whereof the shank is threadedly engaged within the tapped axial bore of tubular member 46a which is held against rotation by virtue of its connection to the torque arm 47a. The inner race of an anti-friction thrust bearing 61a abuts a circumferential shoulder 65 at the inner end of member 46a, the outer race of said bearing being engaged with a flanged annular element 59a which, in this instance, is secured to the wedge bushing 35a by a pair of screws 66 (see Figs. 6 and 7), and which provides the shoulder 60a to react with the internal annular shoulder 28a of split hub sleeve 19a. It is also to be noted that here, wedge bushing 35a is formed internally with a stop flange 35x, see Fig. 5, which is abutted by the outer race of thrust bearing 61a. Anchored in the inner end of the wedge bushing 30a is a group of four annularly-arranged studs 67 which pass outward through registering clearance holes in wedge bushing 35a and attached part 59a. Helical springs 43a in compression between nut heads 68 threadedly engaged upon the distal ends of studs 67 and the outer face of wedge element 35a serve as the means by which the latter is yieldingly urged toward wedge bushing 30a to keep split hub sleeve 19a expanded and thereby normally prevent the sheave flanges 15a—18a from being shifted axially by the springs 44a and 45a. As shown, the springs 44a and 45a are, in this instance, buttressed by flanges 37a and 40a on opposite ends of said hub sleeve. Screw 54a reacts upon a block 69 set into the inner race of thrust bearing 57a, the outer race of the latter being set into a shouldered annular recess at the inner end of wedge bushing 30a. In order to obviate the necessity for repetitive description, all other component elements in the alternative embodiment not specifically referred to but having their counterparts in the first described embodiment, are identified by the same reference numerals previously employed, with addition in each instance of the exponent "a" for convenience of more ready distinction. When in Figs. 5–7, a speed ration change is to be made, screw 54a is turned clockwise, with the result that wedge element 35a is drawn leftward against the resistance of springs 43a and thereby eased outward of the internal taper 26a at the corresponding end of split hub sleeve 19a. Eventually, the shoulder 60a of flanged part 59a connected to wedge element 35a will contact internal shoulder 28a of hub sleeve 19a and thereafter cause the latter to be drawn to the left with said element relative to bushing 30a. Hub sleeve 19a is thereby permitted to contract circumferentially and thus allow the sheave flanges 15a, 17a and 16a, 19a to be shifted to new relative positions in the same manner as described in connection with the embodiment of Fig. 1. After the desired adjustment is attained, screw 54a is backed off to allow wedge element 35a and split hub sleeve 19a to be forced rightward in respect to wedge bushing 30a by the springs 43a, to their normal positions to hold the sheave flanges 15a—18a against subsequent accidental displacement.

Figure 8:
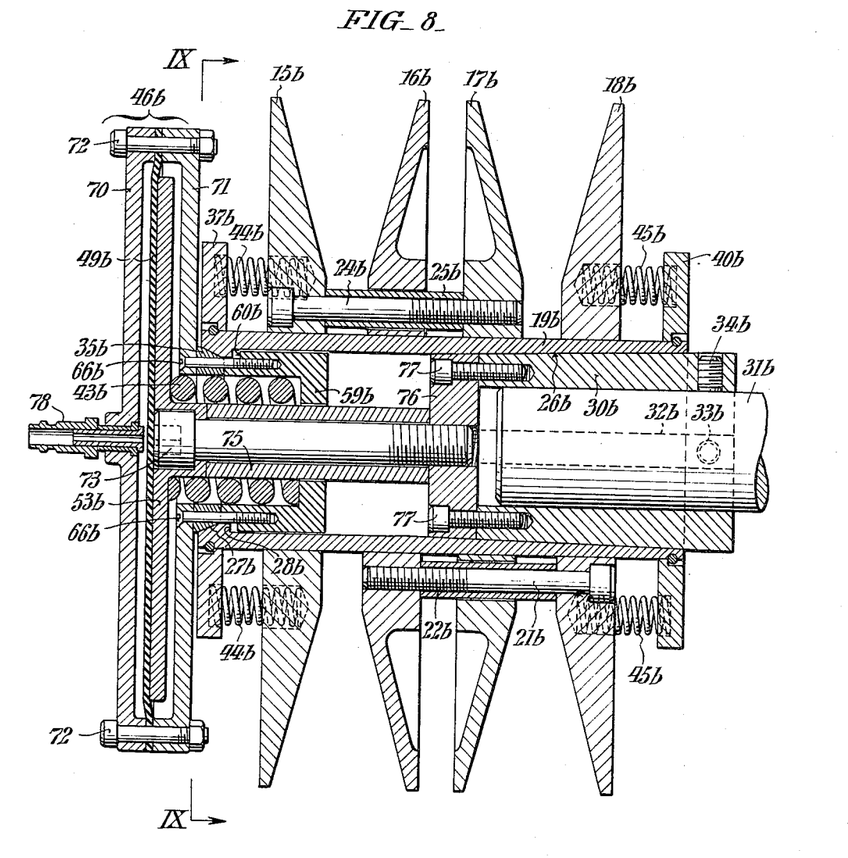
Fig. 8 is a longitudinal section likewise generally similar to Fig. 1, of another alternative embodiment of my invention.
Figure 9:
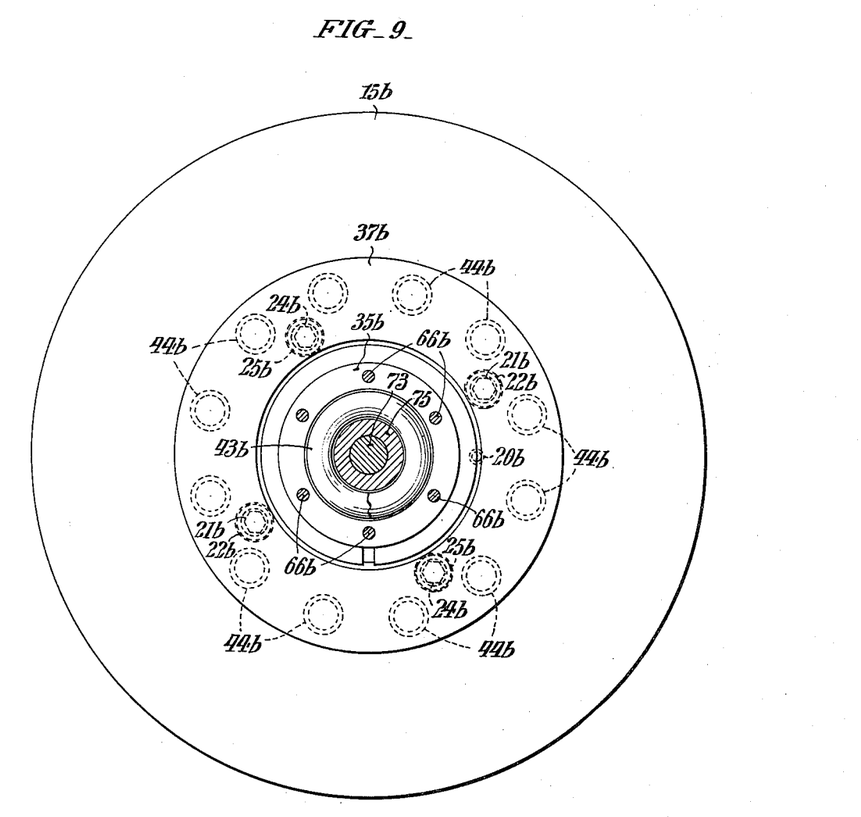
Fig. 9 is a transverse section taken as indicated by the angled arrows IX—IX in Fig. 8.

In the embodiment illustrated in Figs. 8 and 9, a diaphragm motor is provided to serve as a power means for controlling the sheave. As shown, the casing 46b of this motor has two side wall components 70 and 71 between the opposing inwardly-directed peripheral flanges of which the circumferential edge of the diaphragm 49b is clamped by screw bolts 72. A hollow axial boss projection is formed on the casing component 71 of the motor by parts 35b and 59b of which the former is tapered for service as the wedge element to cooperate with the short taper 27b at one end of the bore of split hub sleeve 19b, said parts being fixedly connected to said casing component by screws 66b. A stout helical compression spring 43b within the hollows of parts 35b and 59b exerts its pressure upon backing plate 53b associated with diaphragm 49b. By means of a headed axial screw 73, plate 53b is secured, with interposition of a tubular axial prolongation 75 which is surrounded by spring 43b and passes through a clearance aperture in the closed end portion of part 59b on casting component 71, to a disk head 76 affixed in turn by screws 77, to the inner end of the wedge bushing 30b. At the center, casing component 70 of motor 46a has an inlet nipple 78 for attachment of a hose through which operating fluid under pressure (which may be air) can be introduced under control of a suitable valve, not illustrated. It is to be noted that in this instance, the flange 37b and 40b for the sheave flange shifting springs 44b, 45b are mounted on the protruding ends of split hub sleeve 19b in the same manner as in Fig. 5. Here again, in order to dispense with repetitive description, all other component elements not specifically referred to but having their counterparts in the preceeding embodiments are identified by the same reference numerals previously employed with addition, in each instance, of the exponent "b" for convenience of more ready distinction.

In Fig. 8, upon admission of pressure fluid into motor 46b, the latter will be bodily shifted leftward relative to plate 53b on diaphragm 49b. As a consequence, wedge element 35b will be first withdrawn from engagement with the taper 27b at the corresponding end of hub sleeve 19b until shoulder 60b on part 59b incounters the internal shoulder 28b of said sleeve. After this occurs, hub sleeve 19b will be carried along and eased relative to bushing 30b, and will eventually contract to release sheave flanges 15b—18b so that the latter may shift axially for speed change, this action being yieldingly resisted by springs 43b. Upon exhausting the pressure fluid from motor 46b after the desired adjustment has been achieved, springs 43b, in reacting, will cause parts 19b and 35b to resume the normal positions in which they are shown in Fig. 8 to hold sheave flanges 15b—18b against shifting in their new re-set positions. Diaphragm motor 46b and all the other parts revolve with shaft 31b, nipple 78 extending through an axial bearing boss on casing component 79, and therefore, remaining stationary.

Figure 10:
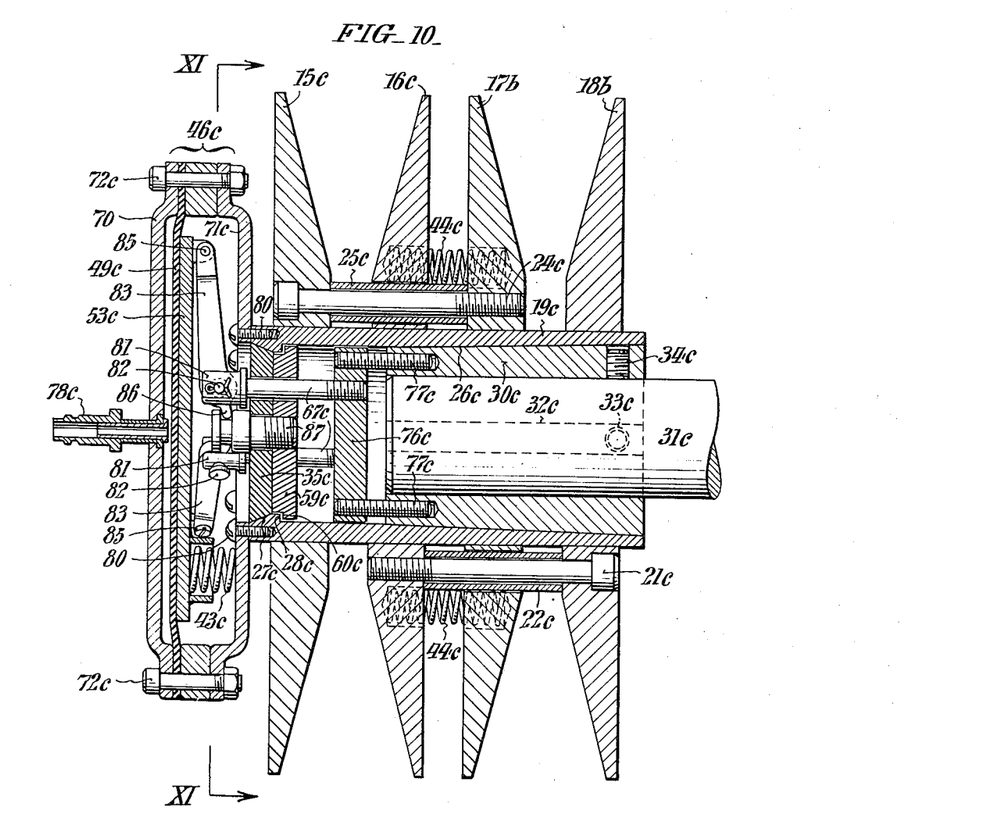
Fig. 10 is a view in longitudinal section in turn like Fig. 1, showing still another alternative embodiment.
Figure 11:
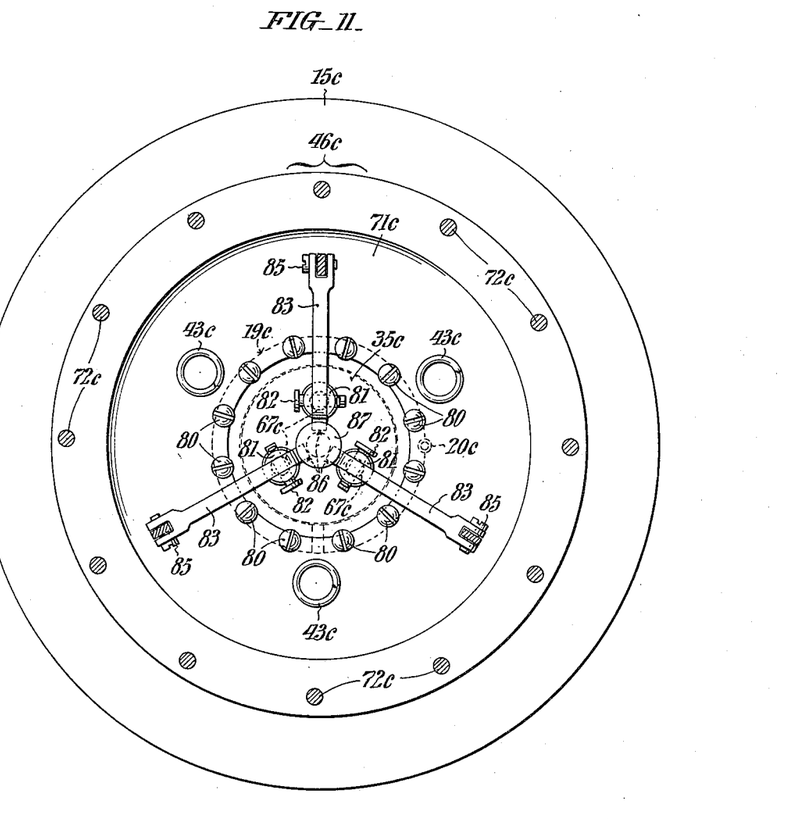
Fig. 11 is a transverse section taken as indicated by the angled arrows XI—XI in Fig. 10.

In the modified construction disclosed in Figs. 10 and 11, the casing of diaphragm motor 46c is fixedly secured to the left hand or distal end of split hub sleeve 19c by screws 80. The studs 67c of which there are three in this instance, are arranged in annularly spaced relation and anchored in head 76c which is affixed to the inner end of wedge bushing 30c by screws 77c. The studs 67c pass through clearance holes in a solid wedge element 35c and the associated flanged part 59c which provides the shoulder 60c to react with the internal shoulder 28c of hub sleeve 19c. Here, however, the studs 67c have, at their distal ends within the hollow of motor casing 46c, heads 81 which are clevised for the reception and pivoting, by means of crosswise pins 82, of radially-arranged lever arms 83 whereof the distal ends are pivotally connected at 85 respectively to plate 53c associated with diaphragm 49c. As shown, lever arms 83 are formed with relatively short finger projections 86 which engage into a circumferential groove in the projecting head of a centrally disposed screw element 87 by which part 59c is secured to wedge element 35c. Springs 43c in compression between diaphragm disk 53c and wall 71c of motor 46c are relied upon to normally keep wedge element 35c in wedging engagement with split hub sleeve 19c, and said sleeve in wedging engagement with bushing 30c. In Figs. 10 and 11, springs 44c in compression between sheave flanges 16c and 17c are relied upon to shift the two sheave flange groups upon release. Here again to avoid duplicity, all elements not particularly referred to in Figs. 10 and 11 but having their counterparts in the previously described embodiments, are identified by the same reference numerals with addition in each instance, of the letter "c".

In Fig. 10, upon admission of pressure fluid into the casing of motor 46c by way of nipple 78c, diaphragm 49c is moved rightward, with attendant movement of lever arms 83 about their pivots 82, and withdrawal of wedge bushing 35c leftward from the internal end taper 27c of hub sleeve 19c by reaction of the fingers 86c on said arms with stud 87. Eventually, when shoulder 60c of part 59c contacts the internal shoulder 28c of split hub sleeve 19c, movement of lever arms 83 about their pivots 82 will be checked and diaphragm disk 53c consequently arrested. Under the further influence of the pressure fluid thereafter, casing of motor 46c will be bodily moved leftward, carrying with it split hub sleeve 19c which will then contract circumferentially to release sheave flanges 15c—18c for positional change. Upon exhausting of the actuating fluid from motor casing 46c, springs 43c immediately take over and restore parts 19c and 35c to their normal positions relative to each other and bushing 30c as in Fig. 10.

Having thus described my invention, I claim:

1. In an adjustable sheave, a split hub sleeve; at least one pair of opposingly-beveled annular flanges mounted on the hub sleeve; yielding means embodied in the sheave and tending to shift the flanges laterally relative to each other along the sleeve; wedge means within the sleeve; yieldable means acting upon the wedge means to normally keep the sleeve expanded within the flanges and thereby hold the flanges against lateral displacement on the sleeve; and adjusting means operable during rotation of the sheave including a yieldingly supported control means, means rotative with the sheave for moving the wedge means axially in opposition to the spring means to permit contraction of the hub sleeve and release of the flanges to the action of the yielding means, and interposed actuating connections between said control means and said wedge moving means.

2. An adjustable sheave according to claim 1, wherein the hub sleeve is provided with a spline, and wherein the sheave flanges are notched to engage the spline and thereby constrained against rotation relative to the hub sleeve.

3. In an adjustable sheave, a split hub sleeve; at least one pair of opposingly-beveled annular sheave flanges mounted on the hub sleeve; yielding means tending to shift the sheave flanges laterally relative to each other along the hub sleeve; tapered wedge elements respectively engaging into opposite ends of the hub sleeve; spring means drawing the wedge elements axially toward each other to circumferentially expand the hub sleeve within the sheave flanges and thereby normally hold them against displacement on the sleeve; and adjusting means operable during rotation of the sheave including a yieldingly supported control means, means rotative with the sheave for moving the wedge elements in opposition to the spring means and so allow the hub sleeve to contract circumferentially for release of the sheave flanges to the influence of said yielding means, and interposed actuating connections between said control means and said wedge element moving means.

4. In an adjustable sheave, a split hub sleeve; a pair of opposingly beveled annular sheave flanges mounted on the hub sleeve; yielding means tending to shift the sheave flanges laterally relative to each other along the sleeve; a tapered bushing and a tapered wedge element respectively engaging into opposite ends of the hub sleeve and respectively having flanges on their protruding ends; an annular abutment ring beyond the protruding end of the wedge bushing and spaced from the flange of the latter; tie bolts extending through aligned clearance holes in the sheave flange and connecting the flanges of the wedge element and abutment ring; springs in compression between the flange on the wedge bushing and the abutment ring, whereby the wedge element is drawn toward the wedge bushing to circumferentially expand the hub sleeve within the sheave flanges and so hold the latter against displacement on the hub sleeve; and adjusting means operable during rotation of the sheave including a yieldingly supported control means, means rotative with the sheave for moving the wedge bushing and the wedge element in opposition to the springs and thereby allow the hub sleeve to contract circumferentially for release of the sheave flanges to the influence of the yielding means, and interposed actuating connections between said control means and said bushing and said wedge moving means.

5. An adjustable sheave, according to claim 4, wherein the yielding means includes springs in compression between the abutment ring and one of the sheave flanges, and other springs in compression between the flange on the wedge element and the other sheave flanges.

6. In an adjustable sheave, a split hub sleeve with a bore having a relatively long inward taper at one end, and a shorter more abrupt inward taper at the other end terminating in an internal circumferential shoulder; at least one pair of opposingly-beveled annular sheave flanges mounted on the hub sleeve; yielding means tending to shift the sheave flanges laterally relative to each other along the sleeve; a tapered wedge bushing adapted to be fixedly secured upon the end of a shaft and extending into the long-tapered bore end of the hub sleeve; a tapered wedge element engaging into the short tapered bore end of the hub sleeve and, when in normal wedging position, extending somewhat beyond the circumferential shoulder within the hub sleeve; spring means urging the wedge element axially toward the wedge bushing to normally keep the hub sleeve circumferentially expanded and so prevent lateral displacement of the sheave flanges; a member within the hub sleeve having an annular shoulder in confronting relation to the inner end of the wedge element and the internal shoulder of the hub sleeve; and adjusting means operable during rotation of the sheave including a yieldingly supported control means, means rotative with the sheave for moving the shouldered element outwardly of the hub sleeve, whereby the wedge element and the hub sleeve are successively shifted to limited extents in the same direction relative to the wedge bushing to permit circumferential contraction of the sleeve and release of the sheave flanges to the influence of said yielding means, and interposed actuating connections between said control means and said shouldered element moving means.

7. In an adjustable sheave, a split hub sleeve with a bore having a relatively long inward taper in one end and a shorter more abrupt inward taper at the other end terminating in an internal circumferential shoulder; at least one pair of opposing beveled annular sheave flanges mounted on the hub sleeve; yielding means tending to shift the sheave flanges laterally relative to each other along the hub sleeve; a wedge bushing adapted to be fixedly secured upon a shaft end and extending into the long tapered bore end of the hub sleeve; a tubular wedge element engaging into the short tapered bore end of the hub sleeve and when said element is in normal wedging position, the forward end thereof extends inward somewhat beyond the circumferential shoulder within the hub sleeve; spring means urging the wedge element and the hub sleeve axially toward the wedge bushing to normally keep the hub sleeve circumferentially expanded and thereby prevent lateral displacement of the sheave flanges; an axially hollow member engaged within the wedge element to rotate therewith and having an annular shoulder in confronting relation to the inner end of the wedge element and the internal shoulder of the hub sleeve; a thrust element axially slidably engaged within the hollow of the shouldered member and abutting the inner end of the wedge bushing; a plunger pin with its inner end engaging the thrust element; a yieldingly-supported bearing element to which the hollow member is connected held against rotation and providing sliding guidance for the plunger pin; a transverse operating shaft with an eccentric thereon rotatively supported by the bearing element; and a shoe interposed between the distal end of the plunger pin and the eccentric whereby, upon partial rotation of the operating shaft, the axially hollow shouldered member is shifted outwardly with attendant retraction of the wedge element and the hub sleeve to limited extents relative to the wedge bushing in opposition to the spring means by coaction between the shoulder of said member with the confronting end of the wedge element and the internal shoulder of the hub sleeve, to permit circumferential contraction of said sleeve and release of the sheave flanges to the influence of said yielding means.

8. In an adjustable sheave, a split hub sleeve with flanges at opposite ends thereof; at least one pair of opposingly-beveled annular sheave flanges mounted on the hub sleeve; spaced annularly arranged springs in compression between the respective sheave flanges and the flanges at opposite ends of the hub sleeve tending to shift the sheave flanges laterally relative to each other along the hub sleeve; wedge means associated with the hub sleeve; spring means influential upon the wedge means to circumferentially expand the hub sleeve within the sheave flanges and thereby normally hold them against lateral displacement on the sleeve; and adjusting means operable during rotation of the sheave including a yieldingly supported control means, means rotative with the sheave for retracting the wedge means and thereby permit circumferential contraction of the hub sleeve for release of the sheave flanges to the influence of the springs, and interposed actuating connections between said control means and said wedge retracting means.

9. An adjustable sheave according to claim 8, wherein the hub sleeve is provided with a spline, and wherein the sheave flanges are notched to engage the spline and thereby constrained against rotation relative to the hub sleeve.

10. In an adjustable sheave, a split hub sleeve with a bore having a relatively long inward taper at one end and a shorter more abrupt inward taper at the other end terminating in an internal circumferential shoulder; at least one pair of opposingly-beveled annular sheave flanges mounted on the hub sleeve; yielding means tending to shift the sheave flanges laterally relative to each other along the hub sleeve; a tapered wedge bushing adapted to be fixedly secured upon the end of a shaft and extending into the long tapered bore end of the hub sleeve; a tapered tubular wedge element engaging into the short tapered bore end of the hub sleeve and having a circumferential flange at its inner end normally positioned somewhat beyond the circumferential shoulder within the hub sleeve; spring means urging the wedge element axially toward the wedge bushing to normally keep the hub sleeve circumferentially expanded and thereby prevent lateral displacement of the sheave flanges; and adjusting means operable during rotation of the sheave including a yieldingly supported control means, means rotative with the sheave for moving the wedge element outwardly of the hub sleeve in opposition to the spring means with incidental retraction of said element and said sleeve relative to the wedge bushing to permit circumferential contraction of the sleeve for release of the sheave flanges to the influence of the yielding means, and interposed actuating connections between said control means and said wedge element moving means.

11. In an adjustable sheave, a split hub sleeve with a bore having a relatively long inward taper in one end and a shorter more abrupt inward taper at the other end terminating in an internal circumferential shoulder; at least one pair of opposingly-beveled annular sheave flanges mounted on the hub sleeve; yielding means tending to shift the sheave flanges laterally relative to each other along the hub sleeve; a tapered wedge bushing adapted to be fixedly secured upon the end of shaft and extending into the long tapered bore end of the hub sleeve; a tapered tubular wedge element engaging into the short tapered bore end of the hub sleeve and having a circumferential flange at its inner end normally positioned beyond the circumferential shoulder within the hub sleeve; spaced annularly-arranged headed studs with their shanks passing through clearance holes in the wedge element and anchored in the inner end of the wedge bushing; springs in compression between the stud heads and the outer face of the wedge element whereby the latter is urged toward the wedge bushing to circumferentially expand the hub sleeve within the sheave flanges and thereby normally prevent lateral displacement of the latter; and adjusting means operable during rotation of the sheave including a yieldingly supported control means, means rotative with the sheave for moving the wedge element outward in opposition to the springs with incidental retraction of said element and said sleeve relative to the wedge bushing to permit circumferential contraction of the sleeve for release of the sheave flanges to the influence of the yielding means, and interposed actuating connections between said control means and said wedge element moving means.

12. An adjustable sheave according to claim 10, wherein the split hub sleeve has flanges respectively at its protruding ends; and wherein spaced annularly-arranged springs respectively in compression between the sheave flanges and the end flanges of the hub sleeve constitute the means tending to shift the sheave flanges laterally along said sleeve.

13. An adjustable sheave according to claim 10, wherein the operating means includes a member constrained against rotation and axially connected, with interposition of an anti-friction thrust bearing, to the wedge element, a screw threadedly engaged in said member, and an abutment element disposed, with interposition of an anti-friction thrust bearing, in the inner end of the wedge bushing and engaged by the shank end of said screw.

14. In an adjustable sheave, a split hub sleeve with a bore having a relatively long gentle inward taper at one end, and a shorter more abrupt inward taper at the other end terminating in an internal circumferential shoulder; at least one pair of opposingly-beveled annular sheave flanges mounted on the hub sleeve; yielding means tending to shift the sheave flanges laterally relative to each other along the sleeve; a tapered wedge bushing adapted to be fixedly secured upon the end of a shaft and extending into the long-tapered bore end of the hub sleeve; an axially hollow tapered wedge element engaging into the short tapered bore end of the hub sleeve and providing a circumferential shoulder in confronting relation to the circumferential shoulder within the hub sleeve; a diaphragm motor having a casing, said casing being secured in axial relation to the outer end of the wedge element; a plate backed against the diaphragm within the casing of the motor and having a hub prolongation which extends through an axial clearance opening in the back of the wedge element and which is secured to the inner end of the wedge bushing; a helical spring surrounding the hub prolongation within the hollow of the wedge element and in compression between the back of said element and the diaphragm plate, whereby said wedge element is drawn toward the wedge bushing to normally keep the hub sleeve circumferentially expanded and so prevent lateral displacement of the sheave flanges; and a hose attaching nipple engaged in an axial bearing on the outer wall of the motor casing through which diaphragm-actuating pressure fluid can be admitted whereby, through the interposed parts, the wedge element and the hub sleeve are retracted in succession relative to the wedge bushing in opposition to the spring by amounts sufficient to permit circumferential contraction of said sleeve for release of the sheave flanges to the influence of the yielding means.

15. An adjustble sheave according to claim 14, wherein the hub sleeve is provided at opposite ends with flanges, and wherein groups of annularly arranged springs respectively in compression between said flanges and the opposing sheave flanges constitute the yielding means.

16. An adjustable sheave according to claim 14, wherein the hub sleeve is provided with a spline; and wherein the sheave flanges are notched to engage the spline and thereby constrained against rotation relative to the hub sleeve.

17. In an adjustable sheave, a split hub sleeve with a bore having a relatively long gentle inward taper at one end, and a shorter more abrupt inward taper at the other end terminating in an internal circumferential shoulder; at least one pair of opposingly beveled annular sheave flanges mounted on the hub sleeve; yielding means tending to shift the sheave flanges laterally relative to each other along the hub sleeve; a tapered wedge bushing adapted to be fixedly secured upon the end of a shaft and extending into the long tapered bore end of the hub sleeve; a solid tapered wedge element engaging into the short tapered bore end of the hub sleeve, and having a circumferential flange at its inner end normally positioned somewhat beyond the circumferential shoulder within the hub sleeve; a diaphragm motor having a casing, said casing being secured in axial relation to the distal end of the hub sleeve; a plate backed against the diaphragm within the casing of the motor; a circumferentially grooved axial projection on the wedge element extending into the motor casing; a plurality of annularly arranged studs anchored in the inner end of the wedge bushing and extending through clearance holes in the wedge element into the interior of the motor casing; radially-arranged levers individually fulcrumed on the studs within the interior of the motor casing, said levers engaging the groove of the aforesaid projection and having their distal ends pivotally connected to the diaphragm plate adjacent its periphery; compression springs interposed between the rear wall of the motor and the plate on the diaphragm of the latter whereby the wedge element is urged toward the wedge bushing to maintain the hub sleeve circumferentially expanded and so normally prevent lateral displacement of the sheave flanges; and a hose attaching nipple engaged in an axial bearing in the front wall of the motor through which diaphragm-actuating pressure fluid can be admitted to move the levers against the spring resistance and thereby cause, through the interposed parts, axial retraction of the wedge element and the hub sleeve in succession relative to the wedge bushing by amounts sufficient to permit said sleeve to contract circumferentially for release of the wedge flanges to the influence of the yielding means.

18. An adjustable sheave according to claim 17, wherein the hub sleeve is provided with a spline; and wherein the sheave flanges are notched to engage the spline and are thereby constrained against rotation relative to the hub sleeve.

19. In an adjustable sheave, a split hub sleeve; at least one pair of opposingly-beveled annular sheave flanges mounted on the hub sleeve; yielding means tending to shift the sheave flanges laterally relative to each other along the hub sleeve; wedge means associated with the hub sleeve; spring means tending to axially shift the wedge means to circumferentially expand the hub sleeve within the sheave flanges and thereby normally hold them against lateral displacement on the sleeve; a motor means connected to and rotating with the sheave; interposed actuating connections between the motor means and the wedge means; and means under manual control for powering the motor means to effect retraction of the wedge means in opposition to the spring means by an amount sufficient to permit circumferential contraction of the hub sleeve for release of the sheave flanges to the influence of the yielding means.

20. In an adjustable sheave, a split hub sleeve; at least one pair of opposingly-beveled annular sheave flanges mounted on the hub sleeve; yielding means tending to shift the sheave flanges laterally relative to each other along the hub sleeve; wedge means within the hub sleeve; spring means tending to axially shift the wedge means to circumferentially expand the hub sleeve within the sheave flanges and thereby normally hold them against lateral displacement on the sleeve; a coaxially arranged diaphragm motor connected to and rotating with the sheave; intermediate operating connections between the diaphragm motor and the wedge means; and a non-rotating connection into the outer wall of the motor casing by way of which diaphragm-actuating pressure fluid can be admitted to effect retraction of the wedge means in opposition to the spring means by an amount sufficient to permit circumferential contraction of the hub sleeve for release of the sheave flanges to the influence of the yielding means.

References Cited in the file of this patent

UNITED STATES PATENTS

| | | |
|---|---|---|
| 2,495,078 | Schweickart | Jan. 17, 1950 |
| 2,610,515 | Williams | Sept. 16, 1952 |